(12) United States Patent
Sahita et al.

(10) Patent No.: US 8,776,245 B2
(45) Date of Patent: Jul. 8, 2014

(54) EXECUTING TRUSTED APPLICATIONS WITH REDUCED TRUSTED COMPUTING BASE

(75) Inventors: Ravi L. Sahita, Portland, OR (US); Ulhas S. Warrier, Beaverton, OR (US); Prashant Dewan, Hillsboro, OR (US); Ranjit S. Narjala, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 932 days.

(21) Appl. No.: 12/645,900

(22) Filed: Dec. 23, 2009

(65) Prior Publication Data

US 2011/0154500 A1    Jun. 23, 2011

(51) Int. Cl.
   G06F 21/00       (2013.01)
   G06F 21/57       (2013.01)
   G06F 21/50       (2013.01)

(52) U.S. Cl.
   CPC .............. *G06F 21/57* (2013.01); *G06F 21/50* (2013.01); *G06F 2221/2149* (2013.01); *G06F 2221/2153* (2013.01)
   USPC .............................................. 726/26; 726/29

(58) Field of Classification Search
   CPC .................................. G06F 21/57; G06F 21/50
   See application file for complete search history.

(56) References Cited

U.S. PATENT DOCUMENTS

| | | | | |
|---|---|---|---|---|
| 5,319,760 A * | 6/1994 | Mason et al. | | 711/208 |
| 5,970,145 A * | 10/1999 | McManis | | 713/187 |
| 6,253,324 B1 * | 6/2001 | Field et al. | | 713/187 |
| 7,243,236 B1 * | 7/2007 | Sibert | | 713/179 |
| 7,464,406 B2 * | 12/2008 | Cromer et al. | | 726/21 |
| 8,171,295 B2 * | 5/2012 | Munetoh et al. | | 713/176 |
| 2003/0074567 A1 * | 4/2003 | Charbonneau | | 713/186 |
| 2003/0188165 A1 * | 10/2003 | Sutton et al. | | 713/176 |
| 2004/0162989 A1 * | 8/2004 | Kirovski | | 713/189 |
| 2005/0223221 A1 * | 10/2005 | Proudler et al. | | 713/164 |
| 2006/0004944 A1 * | 1/2006 | Vij et al. | | 711/6 |
| 2008/0072287 A1 * | 3/2008 | Movva et al. | | 726/2 |
| 2008/0288783 A1 * | 11/2008 | Jansen et al. | | 713/189 |
| 2009/0164994 A1 * | 6/2009 | Vasilevsky et al. | | 718/1 |
| 2009/0323941 A1 * | 12/2009 | Sahita et al. | | 380/44 |
| 2010/0049968 A1 * | 2/2010 | Dimitrakos et al. | | 713/153 |

OTHER PUBLICATIONS

Paul England, Butler Lampson, John Manferdelli, Marcus Peinado, and Bryan Willman. 2003. A Trusted Open Platform. Computer 36, 7 (Jul. 2003), 55-62. DOI=10.1109/MC.2003.1212691 http://dx.doi.org/10.1109/MC.2003.1212691.*

* cited by examiner

*Primary Examiner* — Matthew Henning
(74) *Attorney, Agent, or Firm* — Blakely, Sokoloff, Taylor & Zafman LLP

(57) ABSTRACT

A system for executing trusted applications with a reduced trusted computing base. In one embodiment, the system includes a processor to dynamically instantiate an application protection module in response to a request by a program to be executed under a trusted mode. The system further includes memory to store the program which is capable of interacting with a remote service for security verification. In one embodiment, the application protection module includes a processor-measured application protection service (P-MAPS) operable to measure and to provide protection to the application.

20 Claims, 4 Drawing Sheets

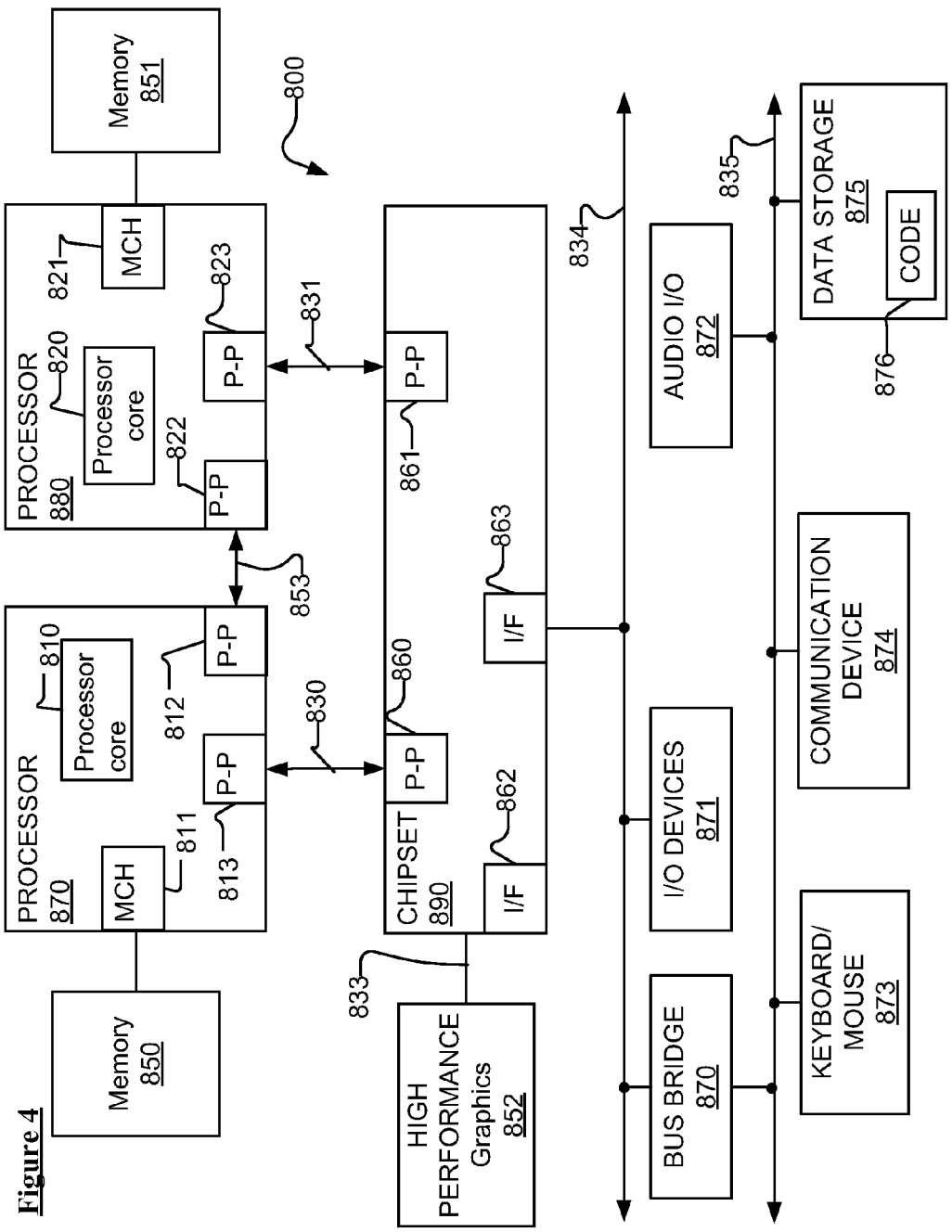

EXECUTING TRUSTED APPLICATIONS WITH REDUCED TRUSTED COMPUTING BASE

FIELD OF THE INVENTION

Embodiments of the invention relate to a trusted computing base of a computer system; more particularly, embodiments of the invention relate to reducing a trusted computing base.

BACKGROUND OF THE INVENTION

Computer security issues are becoming more widespread as an ever-increasing number of diverse computer applications are developed. Trusted Computing Group has been established to develop, define, and promote open standards for hardware-enabled trusted computing and security technologies. These technologies include hardware modules and software interfaces that aim to work across multiple platforms.

A trusted computing base (TCB) of a computer system is a set of hardware, firmware, and software components that are critical to the system security, in the sense that bugs occurring within the TCB might jeopardize the security properties of the entire system. By contrast, parts of a computer system outside the TCB supposedly are unable to leak any more privileges than was granted to them in the first place in accordance to a security policy. The careful design and implementation of a system's TCB is paramount to overall system security.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 4 illustrates a point-to-point computer system for use with one embodiment of the invention.

DETAILED DESCRIPTION OF THE INVENTION

Figure 1:
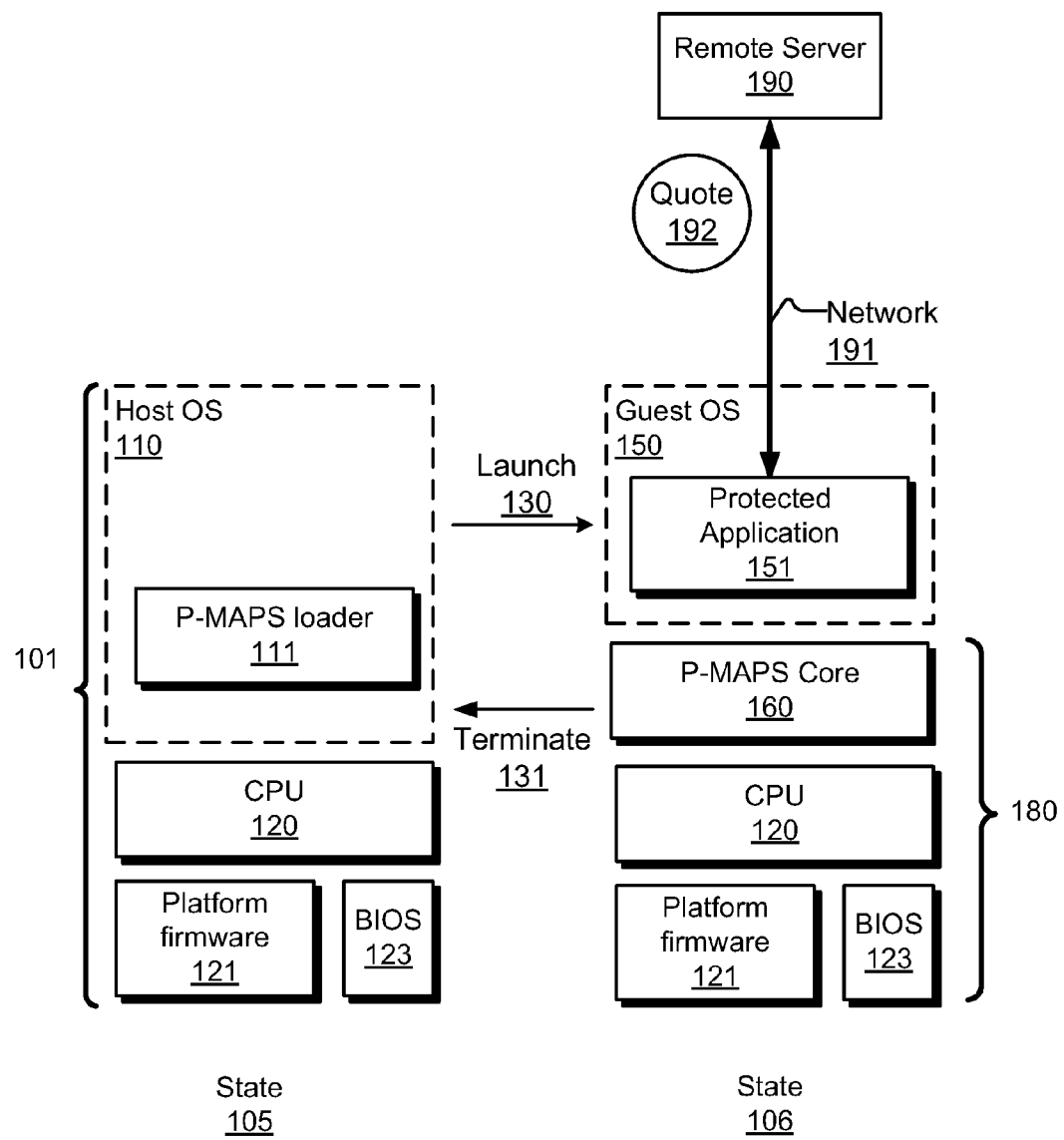
FIG. 1 is a block diagram of a computer system in two different trusted computing base (TCB) states in accordance with one embodiment of the invention.

Embodiments of a system for executing trusted applications with a reduced trusted computing base are presented. In one embodiment, the system includes a processor to dynamically instantiate an application protection module in response to a request by a program to be executed under a trusted mode. The system further includes memory to store the program which is capable of interacting with a remote service for security verification. In one embodiment, the application protection module includes a processor-measured application protection service (P-MAPS) operable to measure and to provide protection to the application.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The methods and apparatuses described herein are for executing trusted applications with a reduced trusted computing base (TCB). Specifically, executing trusted applications with a reduced trusted computing base (TCB) is primarily discussed in reference to multi-core processor computer systems. However, the methods and apparatuses for executing trusted applications with a reduced trusted computing base (TCB) are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

OVERVIEW

Embodiments of a system for executing trusted applications with a reduced trusted computing base are presented. In one embodiment, the system includes a processor to dynamically instantiate an application protection module in response to a request by a program to be executed under a trusted mode. The system further includes memory to store the program which is capable of interacting with a remote service for security verification. In one embodiment, the application protection module includes a processor-measured application protection service (P-MAPS) operable to measure and to provide protection to the application.

In one embodiment, a trusted computing base (TCB) of a computer system is a set of all hardware, firmware, software components, and combinations thereof that are critical to its security, in the sense that bugs occurring within the TCB might jeopardize the security properties of the entire system.

In one embodiment, a trusted platform is able to measure, record, and optionally, verify software that is loaded on the platform by using a combination of hardware, firmware, system architecture, and combinations thereof.

In one embodiment, a trusted platform is able to generate a proof of a system's integrity. The trusted platform generates signed messages that enable a remote party to verify a code module. In one embodiment, the process includes measurement mechanisms, attestation mechanisms, and verification mechanisms. A measurement system defines what measurements will be made, how measurements will be stored, and how the validity is preserved. An attestation mechanism defines a protocol by which these measurements are conveyed to remote parties securely. A remote party uses a verification mechanism to test (verify) the measurements against the expected integrity property.

In one embodiment, taking a measurement of a module (e.g., component, code, data, etc.) means computing a cryptographic hash of the module and extending a hardware-protected hash chain with the module. Taking a measurement of a module is also referred to as performing a measurement on a module or measuring a module.

In one embodiment, a software environment that is measured and launched is referred to as a measured launch environment (MLE). An MLE is system software, such as, for example, an OS kernel and a virtual machine monitor (VMM). An MLE, in different launch mechanisms, uses different types of measurement schemes dynamically (during runtime) or statically. In one embodiment, an authenticated code module (ACM) verifies the state of a processor and a basic input/output system to provide a secure state of the platform when an attempt is made to launch the MLE.

In one embodiment, a software application is trusted if the application is measured, attested, or verified. A trusted software application is also referred to as a protected software application if the platform is able to provide protection (e.g., memory isolation) to the application. In one embodiment, a software application includes programs, such as, for example, a task, a user-level application, guest software, an operating system, a virtual machine, other executable code, or any combination thereof.

Processor-Measured Application Protection Service (P-Maps)

FIG. 1 is a block diagram of a computer system in two different trusted computing base (TCB) states in accordance with one embodiment of the invention. Many related components such as buses and peripherals have not been shown to avoid obscuring the invention.

Referring to FIG. 1, in one embodiment, a computer system in state 105 includes central processing unit (CPU) 120, platform firmware 121, basic input/output system (BIOS) 123, operating system (OS) 110 which further comprises processor-measured application protection service (P-MAPS) loader 111.

In one embodiment, a computer system in state 106 includes central processing unit (CPU) 120, platform firmware 121, basic input/output system (BIOS) 123, processor-measured application protection service (P-MAPS) core 160, and guest operating system (OS) 150 which further includes protected application 151. Protected application 151 communicates with remote server 190 via network 191 to send quote 192.

In one embodiment, a computer system includes input/output (I/O) buffers to transmit and receive signals via interconnect. Examples of the interconnect include a Gunning Transceiver Logic (GTL) bus, a GTL+ bus, a double data rate (DDR) bus, a pumped bus, a differential bus, a cache coherent bus, a point-to-point bus, a multi-drop bus, an PCI-e interconnect, or other known interconnect implementing any known bus protocol.

In one embodiment, state 105 is a state before launching P-MAPS core 160. Trusted computing base (TCB) 101 in state 105 includes CPU 120, platform firmware 121, BIOS 123, and host operating system 110. In one embodiment, not all parts of host operating system 110 are trusted modules. Some untrusted programs, libraries modules, services also run in conjunction with host operating system 110.

In one embodiment, state 106 is a state after P-MAPS measures and provides protection to application 151. TCB 180 in state 106 includes CPU 120, platform firmware 121, BIOS 123, and P-MAPS core 160. In state 106 guest operating system 150 is unprotected and untrusted. Guest operating system 150 has been removed (excluded) from TCB 180. Consequently, the size of TCB 180 is smaller than TCB 101. In one embodiment, TCB 180 is built in conjunction with page-based protection mechanism as described in a currently pending application entitled, "Intra-partitioning of Software Components within An Execution Environment," with application Ser. No. 11/395,488.

In one embodiment, a computer system transitions from state 105 to state 106 (launch 130) in response to a request by application 151 to launch P-MAPS core 160. In one embodiment, a computer system transitions from state 106 to state 105 (terminate 131) in response to a termination of protected application 151, which is followed by a termination of P-MAPS core 160 (by removing P-MAPS 160 and reinstating guest OS 150 to become host OS 110)

In one embodiment, CPU 120 includes one or more processing elements, such as, for example: processing cores, a multiprocessor, a digital signal processor (DSP), a microcontroller, an application specific integrated circuit (ASIC), or a microprocessor.

In one embodiment, BIOS 123 includes a basic input/output system (BIOS) of the computer system or Unified Extensible Firmware Interface (UEFI) modules. BIOS 123 contains segments of code (i.e., routines) that perform system setup during a boot process.

In one embodiment, platform firmware 121 includes routines and codes to perform platform services (e.g., I/O management, cache management, security, etc.). Platform firmware 121 includes an encrypted version of P-MAPS core 160. In one embodiment, other storage (not shown) is used to hold P-MAPS core 160.

In one embodiment, protected application 151 is an application running within OS 150, with modifications to interact with a security firmware, such as, for example, P-MAPS core 160 and P-MAPS loader 111. Protected application 151 interacts with a remote service (e.g., a cloud service). The remote service verifies whether or not protected application 151 is in a correct state for the application to provision service-specific assets to a client.

In one embodiment, P-MAPS loader 111 is OS-specific. P-MAPS loader 111 authenticates and bootstraps P-MAPS core 160. In one embodiment, P-MAPS loader 111 operates in conjunction with virtualization extensions supported by a processor.

In one embodiment, P-MAPS core 160 is an application protection module including a processor-measured application protection service (P-MAPS). P-MAPS core 160 (e.g., P-MAPS service module) is OS-independent. In one embodiment, P-MAPS loader 111 is logically a part of P-MAPS core 160.

In one embodiment, protected application 151 initiates the launch of P-MAPS core 160 via P-MAPS libraries (e.g., P-MAPS load 111). OS 110 is in a host mode and is a part of TCB 101.

In one embodiment, P-MAPS loader 111 authenticates P-MAPS core 160 such that P-MAPS core 160 is instantiated in a trusted way. P-MAPS loader 111 sets up a protected environment within which P-MAPS core 160 executes. As a result, P-MAPS core 160 executes in the highest privilege mode (a root mode). OS 110 transitions to operate in a guest mode (i.e., OS 150). In one embodiment, CPU 120 measures P-MAPS core 160 via an Authenticated Code Module (ACM) in response to the execution of P-MAPS loader 111.

In one embodiment, P-MAPS core 160 measures and isolates a memory region (associated with protected application 151) from the rest of memory regions managed by OS 150. P-MAPS core 160 isolates the memory region from other programs being executed, even from the programs that are of a higher privilege level (such as, for example, an OS).

In one embodiment, protected application 151 requests a platform quote (e.g., quote 192) from P-MAPS Core 160. P-MAPS core 160 uses an authenticated locality to obtain a platform quote specific to protected application 151. P-MAPS core 160 encapsulates memory associated with protected application 151 such that the memory is only accessible to code in measured application pages.

In one embodiment, protected application 151 sends quote 192 to a remote server 190 (via P-MAPS libraries). P-MAPS core 160 supports issuing quote 192 in response to a request by protected application 151. Quote 192 includes a software state of protected application 151, measurements associated with P-MAPS core 160, or both. In one embodiment, quote 192 contains measurement information from platform configuration registers (PCRs) associated P-MAPS core 160. The measurement information (provided by P-MAPS core 160) is useful for determining whether protected application 151 has been measured (authenticated) by P-MAPS core 160.

In one embodiment, remote server 190 (a service provider) verifies quote 192. Remote server 190 verifies that quote 192 is originated from a hardware trusted platform module (TPM). Remote server 190 begins a service specific communication with protected application 151 upon completion of the verification.

In one embodiment, P-MAPS core 160 remains in operation until protected application 151 ends. P-MAPS core 160 terminates (removed from operations) if protected application 151 terminates or upon a request from protected application 151.

In one embodiment, P-MAPS core 160 scrubs any secrets held in protected memory. P-MAPS core 160 updates PCRs, relinquishes virtualization hardware control, and issues an instruction to exit a trusted mode.

In one embodiment, P-MAPS core 160 transfers the execution control back into the untrusted portion of P-MAPS loader 111. Subsequently, P-MAPS loader 111 de-allocates P-MAPS memory (if applicable). In one embodiment, P-MAPS loader 111 keeps the memory allocated for a subsequent use of P-MAPS core 160 (if such an action is requested) or until system shutdown.

In one embodiment, OS 150 resumes in a host mode (OS 110) after the termination of P-MAPS core 160 and features thereof.

In one embodiment, P-MAPS 160 reduces TCB 101 such that the size of TCB 101 is reduced by a significant factor by removing OS services from TCB 101. P-MAPS core 160 is capable of executing an untrusted operating system (running in a guest mode) and omitting the operating system from the TCB 180, such that the size of TCB 180 is smaller than the size of TCB 101.

In one embodiment, P-MAPS core 160 supports on-demand reduction of TCB without preventing the operation of other unprotected applications or services from being executed within OS 150. In one embodiment, scheduling and interrupt handling of OS 150 are not affected by protection supported by P-MAPS core 160. In one embodiment, P-MAPS core 160 supports executing protected application 151 under a trusted mode, within an untrusted operating system, without preventing other untrusted applications from being executed within the untrusted operating system (e.g., OS 150).

In one embodiment, OS 110 is a general-purpose environment where users install unknown and potentially malicious kernel modules that attack a user's applications. In one embodiment, P-MAPS core 160 prevents circumvention of any function entry points (such as a shared library) exposed by protected application 151.

In one embodiment, P-MAPS 160 supports remote attestation of protected application 151, in conjunction with a service provided by remote server 190. P-MAPS 160 verifies that only valid (authenticated) applications are protected. P-MAPS 160 performs runtime measurement of an application to verify the integrity of the application before affording any protection.

In one embodiment, P-MAPS 160 provides in-place protection of applications. Once the application is authenticated, P-MAPS 160 protects code and data memory of protected application 151 in-place within guest OS 150 without isolating protected application 151 into a separate OS or a separate virtual machine.

In one embodiment, remote server 190 receives quote 192 from a program (e.g., protected application 151 with supports from P-MAPS libraries) being executed remotely. In one embodiment, remote server 190 attests to whether or not the program is valid and is executed under protection of a trusted mode based on quote 192. In one embodiment, a remote service provided by remote server 190 is a part of a cloud service. In one embodiment, quote 192 contains information about attestation identity keys (AIKs) for verification of current platform configuration register (PCR) values.

In one embodiment, remote server 190 uses a public key to encrypt a secret before sending it to P-MAPS core 160 for provisioning. Once provisioning is complete, protected application 151 stores a secret (e.g., a key) that is subsequently used during steady-state operation. Protected application 151 sends the secret to P-MAPS core 160 for protection to be sealed in PCR registers. When the secret is needed, protected application 151 requests P-MAPS core 160 to unseal the secret and deposit the secret into protected memory.

In one embodiment, remote server 190 is also referred to a remote service provider. In one embodiment, protected application 151 processes secret data that are provisioned by an entity (remote server 190) in the network. Protected application 151 assures remote server 190 that protected application 151 is being executed in the specified protected environment prior to receiving the secret data.

In one embodiment, network 191 is a network enables communication between protected application 151 and remote server 190. In one embodiment, network 191 operates in conjunction with a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links.

In one embodiment, usage of P-MAPS core 160, for example, is described in Table 1.

TABLE 1

Using P-MAPS core

1. Disable Interrupts
2. Save Segment Registers
3. Save Stack Pointer
4. Save all GPRs
5. Save EFlags
6. Launch P-MAPS
// Execution should resume at (7) after launch with OS in a "guest" mode
// Active and Protected Page Tables are managed by P-MAPS core.
7. Restore EFlags
8. Restore all GPRs
9. Restore Stack Pointer
10. Restore Segment Registers
11. Restore Interrupts In one embodiment, memory allocated via OS services is not trusted. P-MAPS loader 111, for example, allocates memory to launch P-MAPS core 160. In one embodiment, the memory contents include elements as shown in Table 2.

TABLE 2

Memory contents allocated by P-MAPS loader

1. MLE page table: to map the memory elements that will be measured by the GETSEC[SENTER] instruction.
2. MLE header: holds the P-MAPS code entry-point linear address (as interpreted by the MLE page table). After measurement of the P-MAPS core, the ACM transfers control into this entry-point, in protected non-paged mode.
3. Post-SENTER trampoline code and data: This code is measured as part of the MLE and is responsible for switching to the measured global descriptor table (GDT), restoring the memory type range registers (MTRRs), and setting up the post-SENTER page table.

TABLE 2-continued

Memory contents allocated by P-MAPS loader

4. Post-SENTER page table: The P-MAPS core is relocated in memory to execute from an identity memory map that is created via the post-SENTER page table. This page table is created by the measured relocator code.
5. Post-SENTER GDT: This GDT is used in the post-SENTER trampoline code. The GDT is prepared and measured in memory as part of the launch measurement performed by the processor.
6. Post-SENTER relocator code: This code scrubs the memory into which it relocates the P-MAPS core. This code library is pre-compiled at a well-known (static) virtual address base. The post-SENTER code that creates the post-SENTER page table maps this code at the well-known virtual address.
7. Un-relocated P-MAPS core: This measured code is the P-MAPS core that is relocated and executed in VMX root mode to provide the application protection service.
8. Pre-allocated memory: The memory for the P-MAPS core, the P-MAPS core managed heap, and the P-MAPS stack are all pre-allocated and are cleared by the trusted P-MAPS loader before usage.

In one embodiment, launching P-MAPS core 160, for example, includes operations as shown in Table 3.

TABLE 3

Operations to launch P-MAPS core

1. Allocate memory to stage P-MAPS for measurement.
2. Load chipset SINIT ACM.
3. Load P-MAPS core binary image.
4. Create MLE page table that maps part of P-MAPS loader and P-MAPS core that is to be measured and compared against platform launch control policy (LCP).
5. Issue processor instruction GETSEC[SENTER]
6. P-MAPS loader loads measured GDT.
7. Clear TXT error and status registers.
8. Restore MTRRs from state saved in os_mle_data (located on the TXT Heap).
9. Create post-SENTER page table that will be used to enter P-MAPS core. (Note: paging is not turned on yet). The mapping createdin this page table is described in detail below.
10. Switch to post-SENTER page table.
11. Establish stack from (scrubbed) allocated memory.
12. Invoke relocator module to relocate measured P-MAPS core to scrubbed memory (allocated and passed via os_mle_data).
13. Push data needed for OS resume on stack. This includes the OS's original CR3, stack, and return EIP. These data are retrieved from the os_mle_data in the TXT Heap.
14. Push reference to P-MAPS handoff structure in memory on stack (P-MAPS handoff memory mapped in Step 9).
15. Invoke P-MAPS core entry. The P-MAPS core initialization is described in FIG. 7(a).//After Step 15, the P-MAPS core activates VMX and transitions
16. Check GPRs for any error information.
17. If no error, restore OS resume data from stack.
18. Switch to OS guest CR3.
19. Jump to the OS return EIP (virtual address mapped in guest page table, and therefore in active page table).

Reducing a Trusted Computing Based (TCB)

Figure 2:
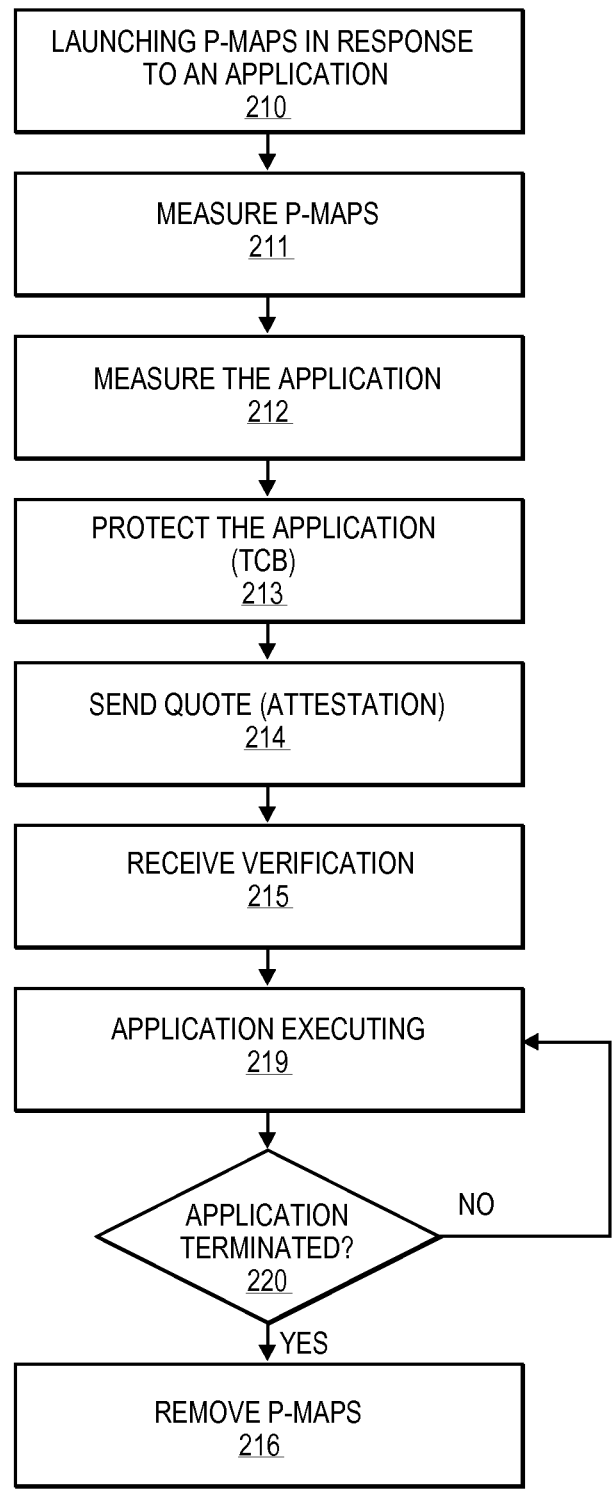
FIG. 2 is a flow diagram of one embodiment of a process to reduce a trusted computing base (TCB) whilst protecting an application.

FIG. 2 is a flow diagram of one embodiment of a process to reduce a trusted computing base (TCB) whilst protecting an application. The process is performed by processing logic that may comprise hardware (circuitry, dedicated logic, etc.), software (such as is run on a general purpose computer system or a dedicated machine), or a combination of both. In one embodiment, the process is performed in conjunction with a module such as, for example, P-MAPS loader 111, P-MAPS 160, and CPU 120 with respect to FIG. 1. In one embodiment, the process is performed by a computer system with respect to FIG. 3.

Referring to FIG. 2, in one embodiment, processing logic begin by launching a P-MAPS module in response to a request from an application (process block 210). In one embodiment, processing logic launches the P-MAPS module in conjunction with P-MAPS libraries (e.g., P-MAPS loader).

In one embodiment, processing logic measures (authenticates) a P-MAPS module such that the P-MAPS module is instantiated in a trusted way (process block 211). Processing logic set up a protected environment within which P-MAPS module executes. In one embodiment, an operating transitions from operating in a host mode to operating in a guest mode.

In one embodiment, processing logic measures a memory region associated with a protected application (process block 212). Processing logic performs the measurement of the memory region to validate code and data associated with the protected application.

In one embodiment, processing logic encapsulates memory associated with a protected application to protect the application from, for example, malicious code (process block 213). In one embodiment, processing logic isolates a memory region associated with a protected application from the rest of memory regions managed by an operating system. In one embodiment, processing logic isolates the memory region from other programs being executed although the programs are of a higher privilege level than the protected application. The size of a TCB is reduced as an operating system is excluded from the TCB.

In one embodiment, processing logic issues a quote in response to a request by a protected application (process block 214). In one embodiment, processing logic sends a quote to a remote server. The quote includes a software state of a protected application, measurements associated with a P-MAPS module, or both. The measurement information is useful for determining whether or not a protected application has been measured.

In one embodiment, processing logic receives an acknowledgement (a provision) from a remote server (process block 215) upon verification by the remote server. In one embodiment, the remote server attests to whether or not the protected application is executed under a trusted mode based on the quote. The remote server begins a service specific communication with the protected application upon completion of the verification. The protected application then executes (process block 219).

In one embodiment, processing logic determines whether or not a corresponding protected application has ended (process block 220).

In one embodiment, processing logic terminates (removed from operation) if a corresponding protected application terminates or upon a request from a corresponding protected application (process block 216). In one embodiment, processing logic scrubs any secrets held in protected memory. Processing logic relinquishes hardware resources and issues an instruction to exit a trusted mode. In one embodiment, processing logic transfers the execution control back into a P-MAPS loader which in turn transfers the control to an operating system.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 3:
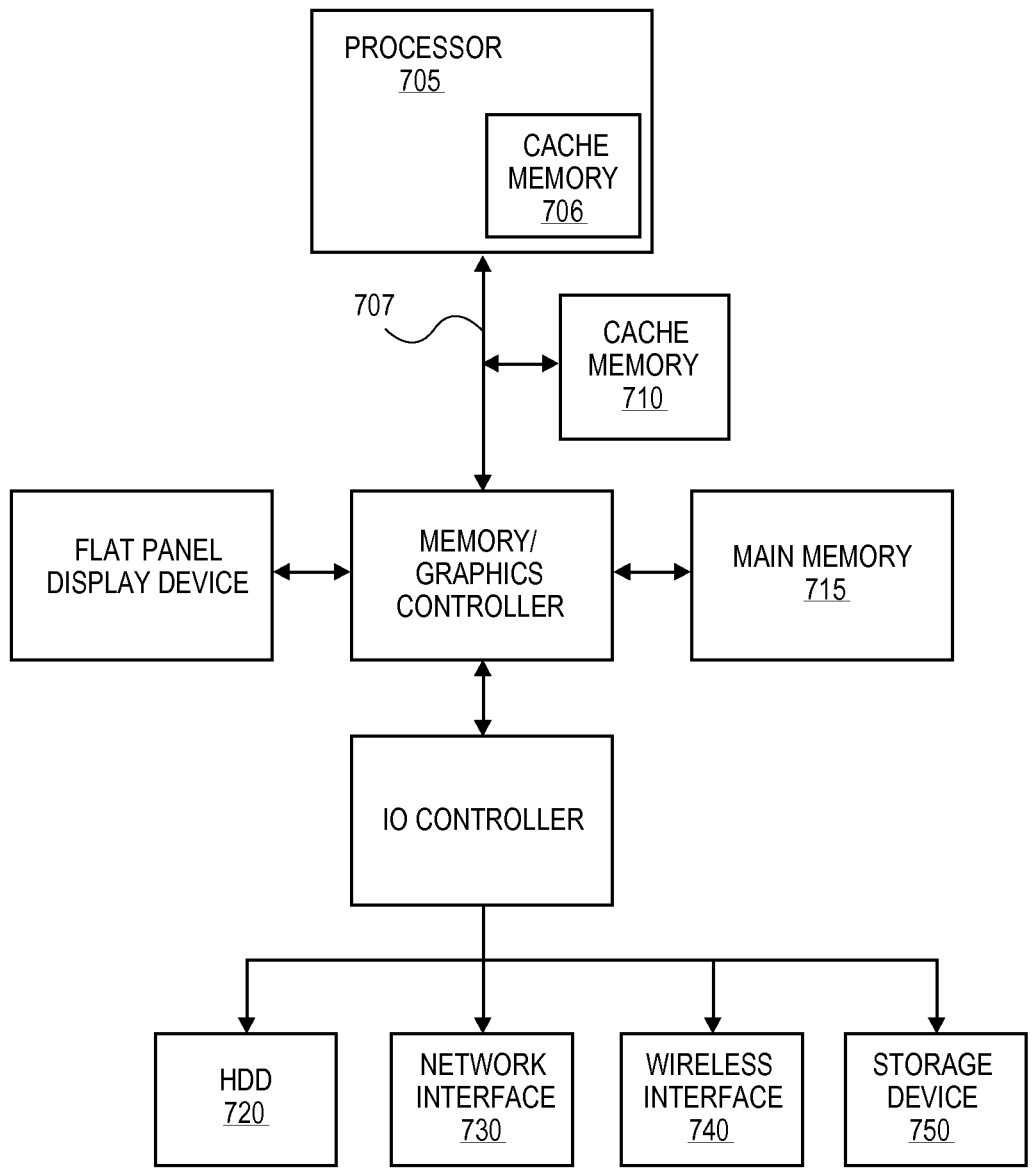
FIG. 3 illustrates a computer system for use with one embodiment of the present invention.

FIG. 3, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed. Additionally, the embodiment may include a generic storage device, for example, a non-volatile credential storage device such as a Trusted Platform Module.

Other embodiments of the invention, however, may exist in other circuits, logic units, or devices within the system of FIG. 3. Furthermore, in other embodiments of the invention may be distributed throughout several circuits, logic units, or devices illustrated in FIG. 3.

Similarly, at least one embodiment may be implemented within a point-to-point computer system. FIG. 4, for example, illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 4.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system comprising:
a processor to instantiate, during runtime, an application protection module in response to a request by an application to be executed under a trusted mode, the application not being an operating system and running within an operating system;
a trusted computing base including system hardware and software resources; and
memory to store the application, wherein the application protection module isolates a first region of the memory from other applications being executed and from the operating system, wherein the application protection module isolates the application from the trusted computing base when executing in the trusted computing mode, and wherein the application is capable of interacting with a remote service for verifying whether the application is executed under the trusted mode with the support of the application protection module.

2. The system of claim 1, wherein the processor is operable to transition an operating system from the trusted computing base (TCB) to execute the operating system in a guest mode and to reduce a size of the TCB by omitting the operating system from the TCB.

3. The system of claim 2, wherein the reduced size TCB includes the processor, the application protection module, a platform firmware, and a basic input/output system (BIOS) but omits an operating system and the application executing under the trusted mode.

4. The system of claim 1, wherein the processor is operable to execute the application under the trusted mode within an untrusted operating system with the presence of other untrusted applications.

5. The system of claim 1, wherein the application protection module includes a processor-measured application protection service (P-MAPS) which is operating-system-independent.

6. A method comprising:
instantiating, during runtime and within a trusted computing base, an application protection module in response to a request by an application to support an execution of the application under a trusted mode, the application not being an operating system and running within an operating system;
measuring the application protection module to validate that the application protection module is trusted;
measuring, by the application protection module, a first memory region associated with the application and not associated with the operating system to validate code and data of the application in the first memory region; and
isolating by the application protection module, the first memory region from other applications being executed within the operating system and isolating the application from the trusted computing base.

7. The method of claim 6, wherein the application protection module includes a processor-measured application protection service (P-MAPS) capable of measuring applications or applications.

8. The method of claim 7, further comprising issuing a quote, in response to the application, to a remote service, wherein the quote comprises measurements associated with the application protection module.

9. The method of claim 8, further comprising storing data associated with measurement of the application as measured by the application protection module into a storage device access-controlled by the application protection module.

10. The method of claim 9, wherein the remote service can provision data meant for the measured application into the storage device after verifying the quote from the application protection module.

11. The method of claim 6, further comprising sending a quote, in response to the application, to a remote service to determine the integrity of the application.

12. The method of claim 6, further comprising transitioning an operating system from executing as a trusted host operating system in a trusted computing base (TCB) to executing as an untrusted operating system in a guest mode outside of the TCB and thereby reducing a size of the TCB by omitting the operating system from the TCB.

13. The method of claim 6, further comprising terminating the application protection module if the application ends.

14. The method of claim 6, further comprising executing the application under the trusted mode without preventing other untrusted applications from being executed within an untrusted operating system, wherein the first memory region is isolated from the untrusted operating system and the untrusted applications.

15. The method of claim 6, wherein the application protection module encapsulates memory associated with the application such that the memory is only accessible to code in measured memory.

16. The method of claim 6, wherein the application protection module prevents a circumvention of an exposed code entry-point associated with the application.

17. The method of claim 6, wherein the application protection module is operating-system-independent.

18. A method comprising:
receiving a quote from an application being executed remotely by a processor during runtime under a trusted mode supported by a measured application protection module, the application protection module being separate from the application and from any operating system, the application being stored in a memory of a trusted computing base, wherein the application protection modules isolates a first region of the memory from other applications being executed and from the operating system, and wherein the application protection module isolates the application from the trusted computing base when executing in the trusted computing mode; and
attesting to whether or not the application is executed under protection of the trusted mode based on the quote.

19. The method of claim 18, wherein the application protection module is a processor-measured application protection service (P-MAPS) capable of measuring applications.

20. The method of claim 18, wherein the quote includes a state of and measurement information regarding the application not including an operating system and measurement information regarding the application protection module.

* * * * *